United States Patent
Croucher

(10) Patent No.: US 11,048,056 B2
(45) Date of Patent: Jun. 29, 2021

(54) FIBER MANAGEMENT CASSETTE

(71) Applicant: Prysmian S.p.A., Milan (IT)

(72) Inventor: Benjamin Croucher, Southampton (GB)

(73) Assignee: Prysmian S.p.A., Milan (IT)

( * ) Notice: Subject to any disclaimer, the term of this patent is extended or adjusted under 35 U.S.C. 154(b) by 0 days.

(21) Appl. No.: 16/677,002

(22) Filed: Nov. 7, 2019

(65) Prior Publication Data

US 2020/0150373 A1 May 14, 2020

(30) Foreign Application Priority Data

Nov. 8, 2018 (IT) .......................... 102018000010175

(51) Int. Cl.
*G02B 6/44* (2006.01)
(52) U.S. Cl.
CPC .................................. *G02B 6/4453* (2013.01)
(58) Field of Classification Search
CPC ... G02B 6/4453; G02B 6/4454; G02B 6/4455
See application file for complete search history.

(56) References Cited

U.S. PATENT DOCUMENTS

| | | | |
|---|---|---|---|
| 5,689,606 A | 11/1997 | Hassan | |
| 6,081,645 A | 6/2000 | Dotzer et al. | |
| 6,112,006 A | 8/2000 | Foss | |
| 9,291,788 B2 | 3/2016 | Rudenick et al. | |
| 2004/0042755 A1* | 3/2004 | Vincent | G02B 6/4454 385/135 |
| 2007/0092195 A1 | 4/2007 | Solheid et al. | |
| 2010/0260464 A1 | 10/2010 | Ayme et al. | |
| 2012/0230645 A1 | 9/2012 | Marmon et al. | |
| 2015/0370025 A1 | 12/2015 | Wells et al. | |
| 2020/0150372 A1 | 5/2020 | Croucher | |
| 2020/0150373 A1 | 5/2020 | Croucher | |

FOREIGN PATENT DOCUMENTS

| | | |
|---|---|---|
| DE | 4438668 A1 | 5/1996 |
| EP | 0215668 A2 | 3/1987 |
| NL | 2008155 C2 | 7/2013 |
| WO | 2018/185136 A1 | 10/2018 |

OTHER PUBLICATIONS

Search Report in counterpart Italian Application No. 201800010175 dated Jun. 28, 2019, pp. 1-2.

* cited by examiner

*Primary Examiner* — John Bedtelyon
(74) *Attorney, Agent, or Firm* — Additon, Pendleton & Witherspoon, P.A.

(57) ABSTRACT

A fiber management cassette for storing loops of one or more optical fiber elements is disclosed. An exemplary cassette comprises: a winding area to accommodate the loops of one or more optical fiber elements; a fiber passageway adjacent to the winding area, the fiber passageway allowing the optical fiber elements to enter and exit the cassette; a pivot element located in the proximity of the fiber passageway, the pivot element being configured to pivot the cassette around a pivot axis perpendicular to a bottom surface of the cassette; and an anti-pull tab comprising a leg extending towards the bottom surface. The anti-pull tab is located in the proximity of the fiber passageway, and the leg is configured to be moved upwards to arrange the optical fiber elements in the fiber passageway underneath the anti-pull tab.

20 Claims, 6 Drawing Sheets

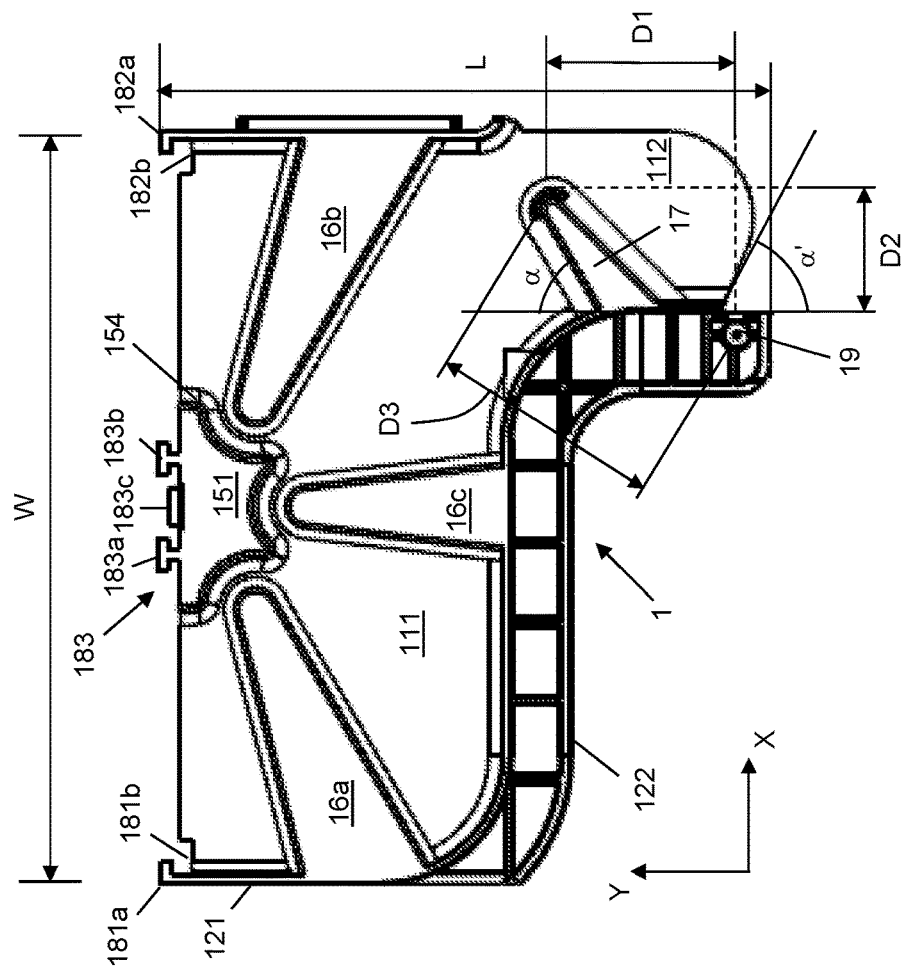
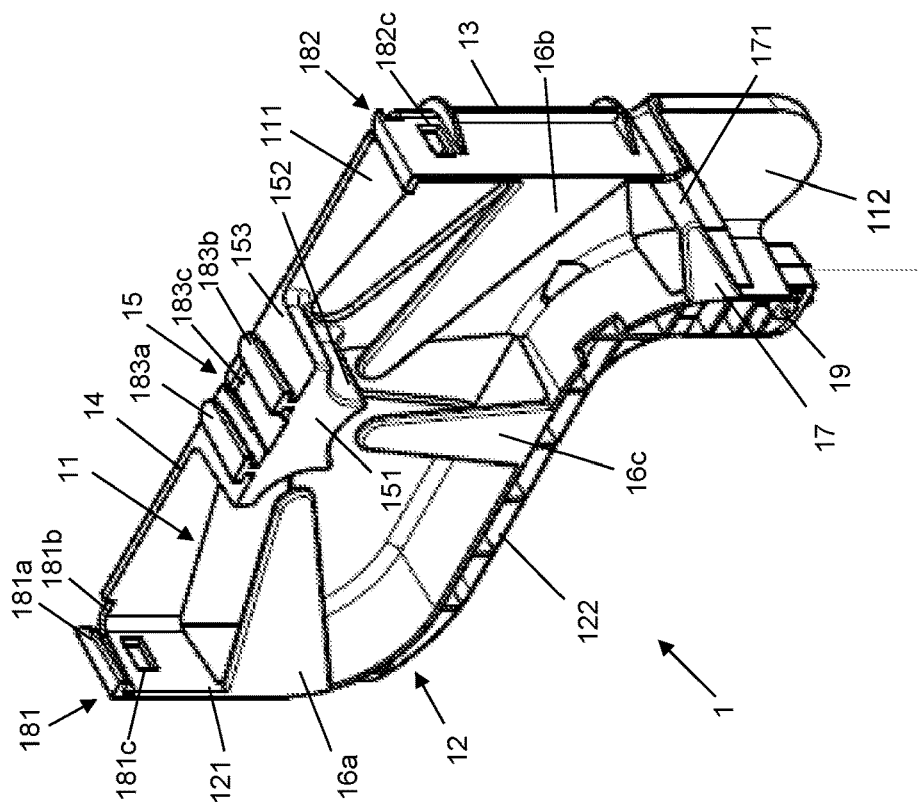
Fig. 1b
Fig. 1a

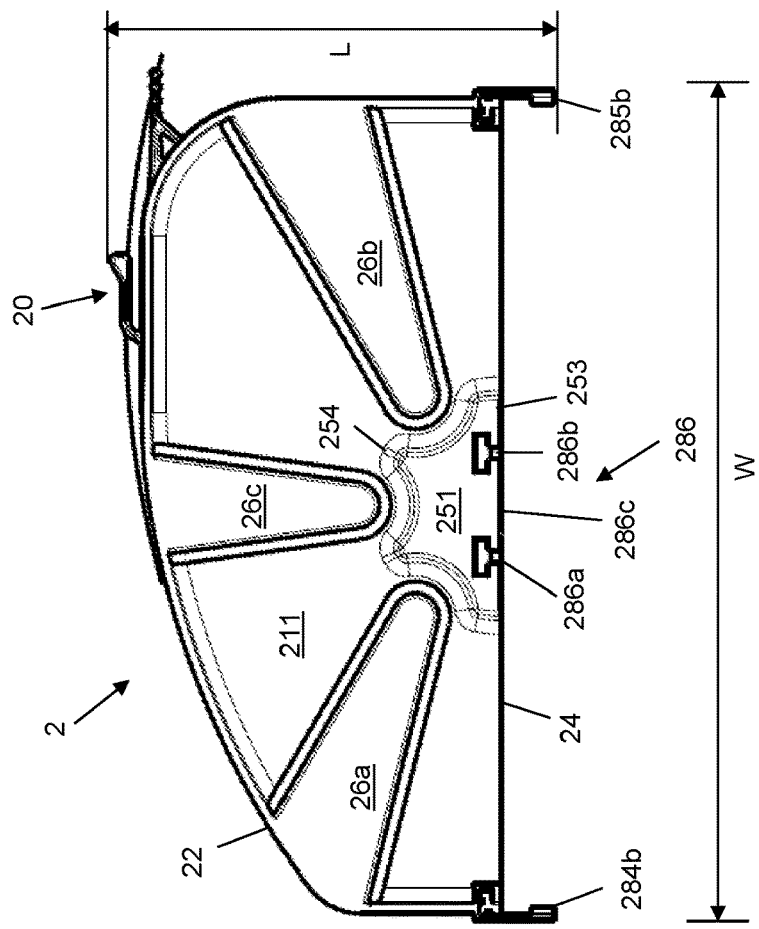
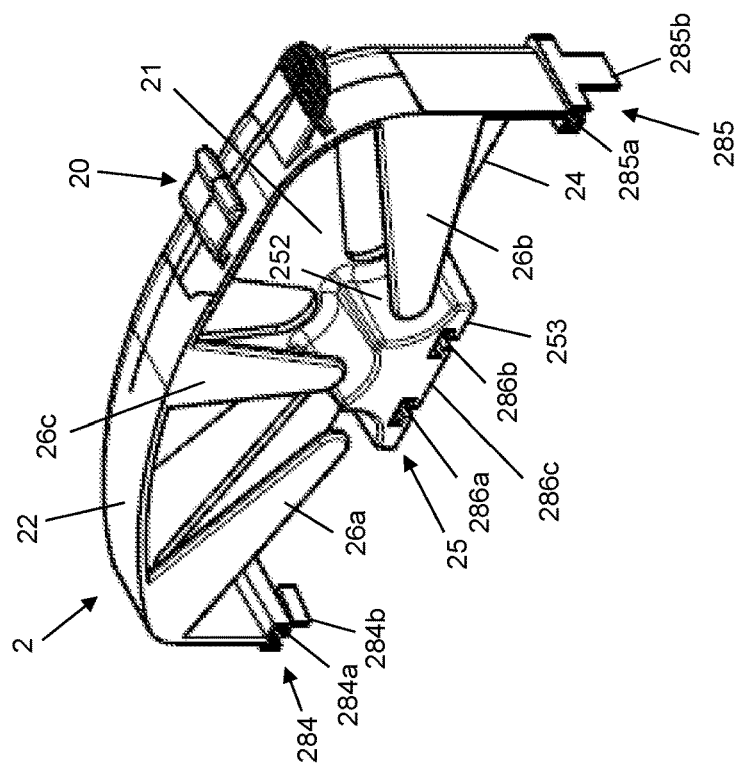
Fig. 2b
Fig. 2a

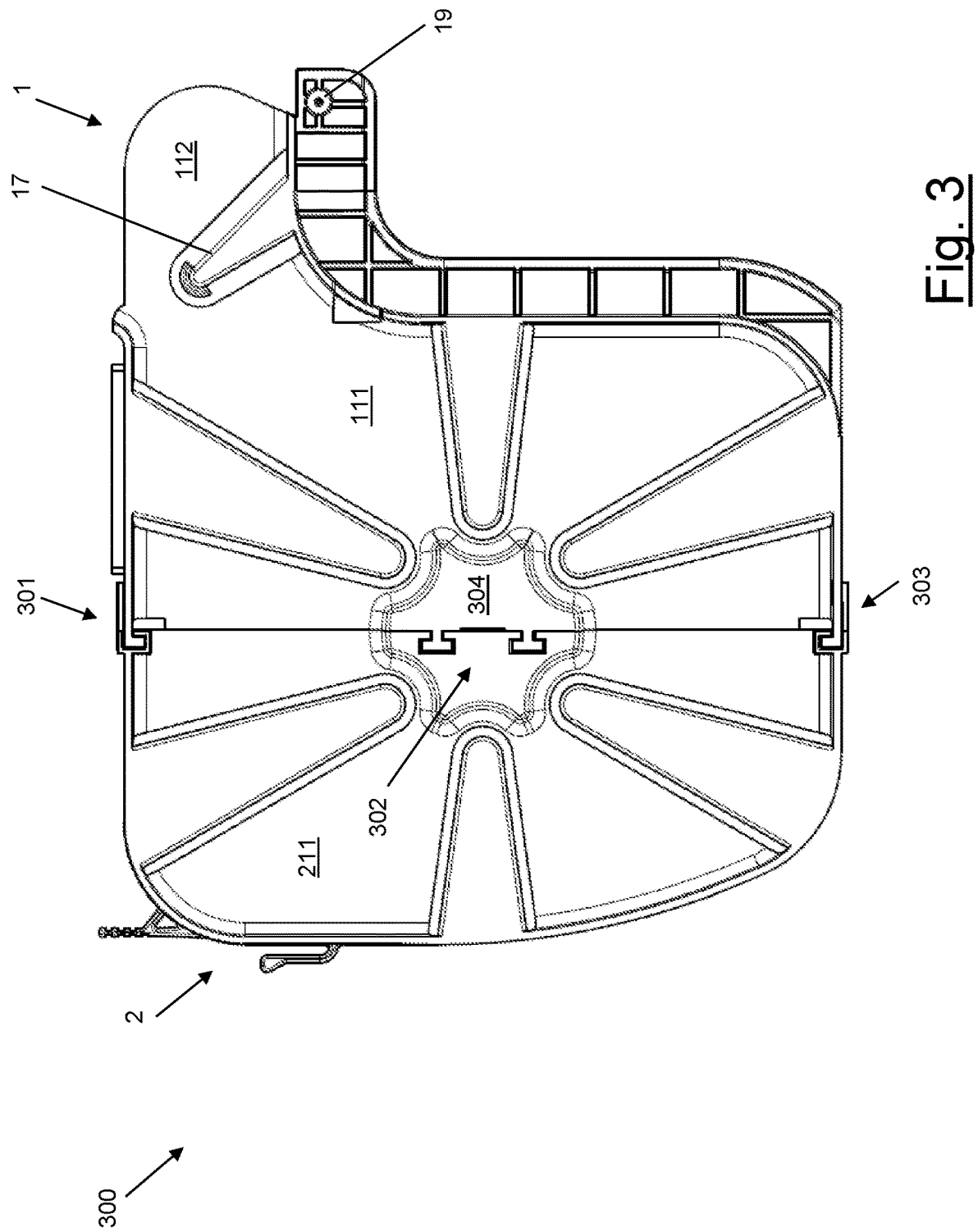

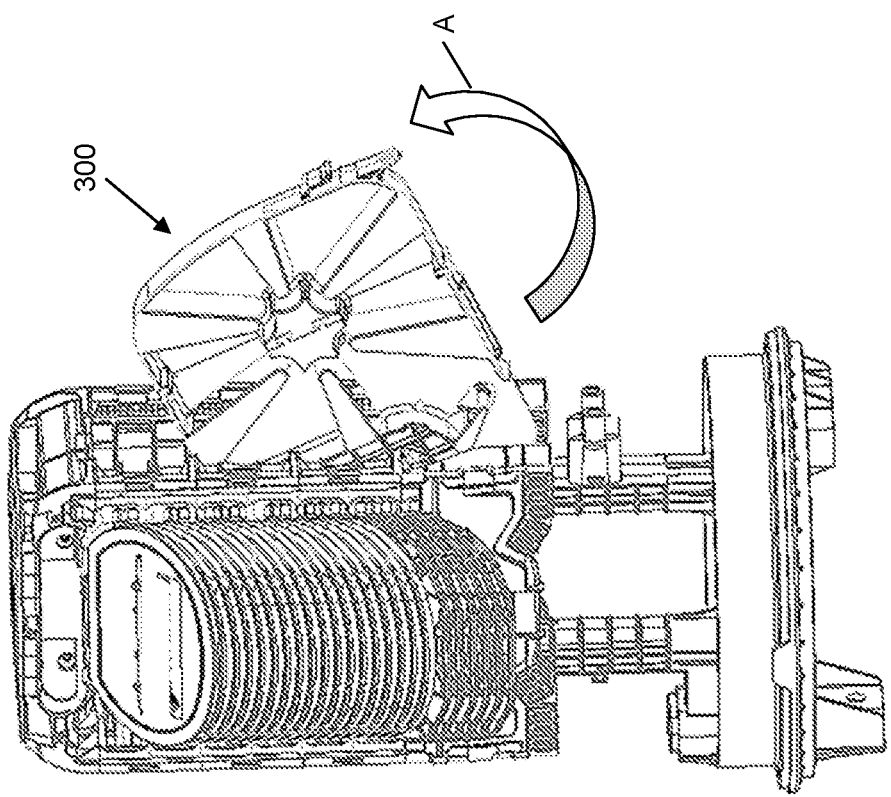
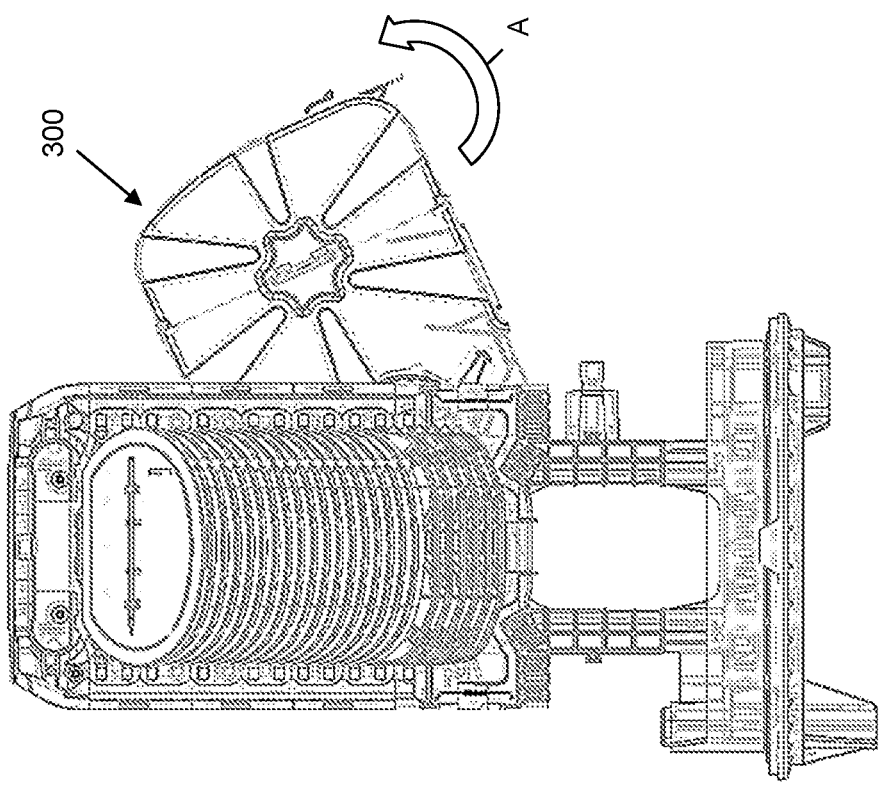
Fig. 5b
Fig. 5a

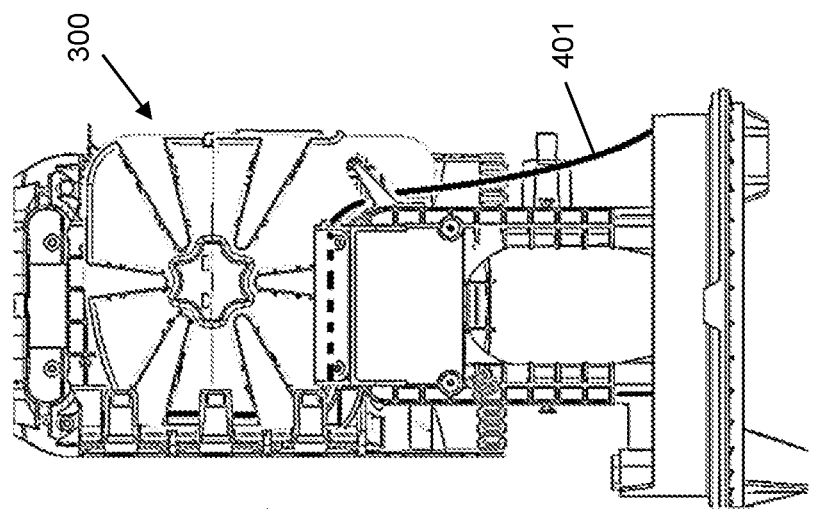
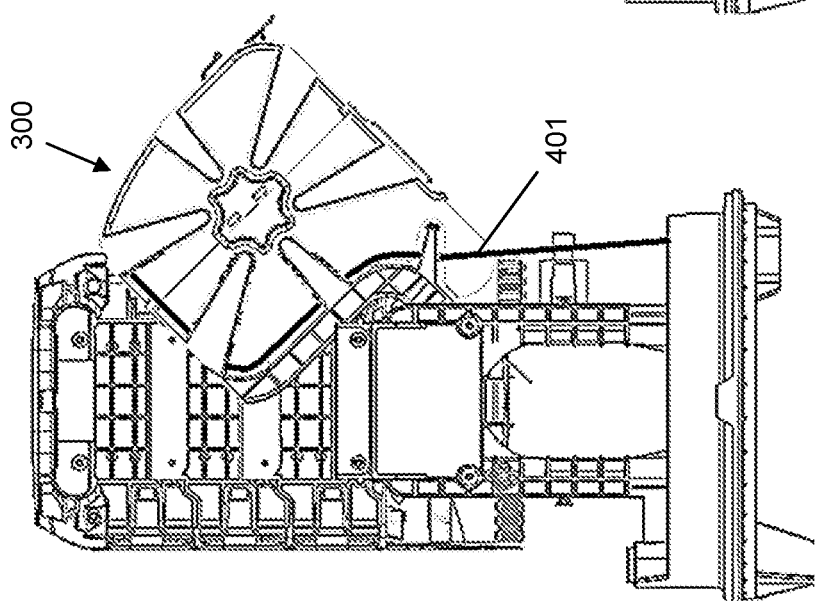
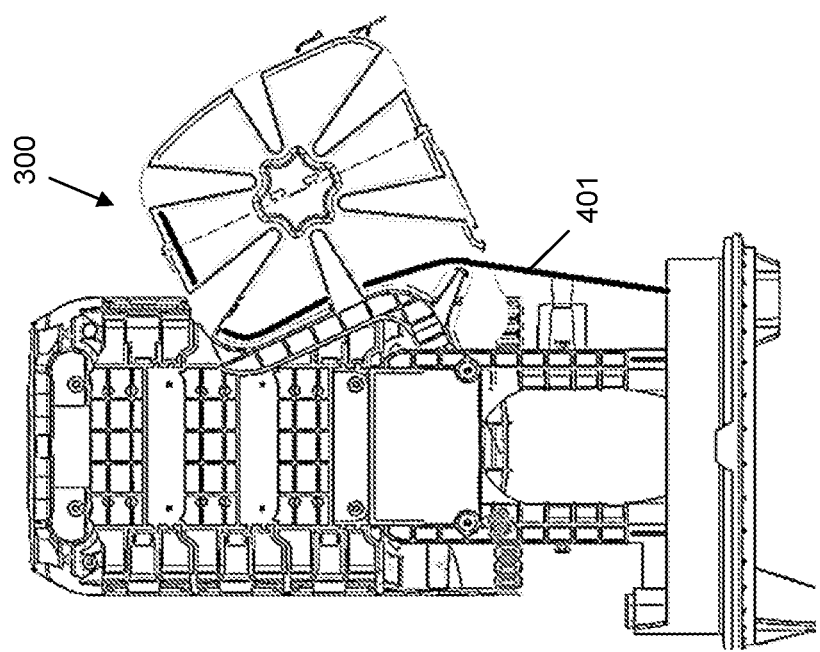

FIBER MANAGEMENT CASSETTE

CROSS-REFERENCE TO PRIORITY APPLICATION

This application claims the benefit of pending Italian Application No. 102018000010175 (filed Nov. 8, 2018, at the Italian Patent and Trademark Office), which is hereby incorporated by reference in its entirety.

FIELD OF THE INVENTION

The present invention relates to the field of optical access networks. In particular, the present invention relates to a fiber management cassette for storing loops of optical fiber elements, in particular for an optical joint closure of an optical access network.

BACKGROUND

As known, in an optical access network, optical joint closures are provided to house the splices between the optical fiber elements of the cables that are routed across the network, and to protect them from dirt, humidity, stresses, etc. The optical joint closures may be capable of accommodating a wide variety of cables (such as, e.g., loose tubes, central loose tubes, FLEXTUBE® cables, blown fibers), and they may be provided in different sizes depending on the splice capacity that is required.

An optical joint closure typically comprises a number of splice trays for storing the splices connecting the optical fiber elements of one or more network cables to respective optical fiber elements of other network cables or to the fibers of the optical cables going to the final users. Moreover, an optical joint closure also stores the loops of optical fiber elements from the cables entering and exiting the joint closure.

Within the optical joint closure, the loops of the optical fiber elements referred to above may be stored in a storage cassette that may be pivotably inserted into the closure. For instance, the storage cassette may be arranged in a substantially vertical position inside the optical joint closure (storage position). When the loops of optical fiber elements are to be installed in the storage cassette, the storage cassette is rotated to the exterior of the optical joint closure, in a position allowing an operator to wind the optical fiber elements into the cassette (loading position). After installation of the optical fiber elements, the storage cassette is rotated back from the loading position to the storage position.

Examples of storage cassettes of the type described above are disclosed in the documents listed herein below.

U.S. Pat. No. 5,689,606, which is hereby incorporated by reference in its entirety, discloses a fiber routing and retention assembly for routing and mounting at least two fibers having a terminal end within an electronic enclosure. The assembly includes a fiber routing track, a fiber tray, and a pivot arrangement. The fiber routing track includes horizontal and vertical legs, each having a guide channel for guiding and retaining the fibers. The fiber routing track also includes attachment structure, such as projections, for attaching the fiber routing track to the electronic enclosure. The fiber tray retains and routes the fibers therein, including the terminal ends of the fibers, and has a raceway including inner and outer walls for routing the fibers therebetween. The pivot arrangement is coupled to the fiber routing track and the fiber tray, permitting the rotational movement of the fiber tray with respect to the track between a stowed position and an access position.

U.S. Pat. No. 6,081,645, which is hereby incorporated by reference in its entirety, discloses a cassette arrangement for cable sleeves or distributors and is composed of a plurality of cassettes for light waveguides. Each cassette is mounted for pivotable movement between a storage position and a working-access position. Each cassette has a pair of deflection elements with circumferential channels for receiving the excess lengths of the light waveguides that are stored in the cassette.

U.S. Pat. No. 6,112,006, which is hereby incorporated by reference in its entirety, discloses a splice enclosure for optical fiber cables and comprises a base having at least one port to receive a folded-over loop of a main optical fiber cable. The enclosure further comprises a plurality of storage trays to receive loops or bights of individual fibers of the cable. The trays are arranged to accommodate splices between the fibers of the main cable and the fibers of stop cables.

SUMMARY

The Applicant noticed that state-of-the-art pivotable storage cassettes may cause tension on the optical fiber elements stored therein when the cassette is rotated back in the storage position after arranging loops of optical fiber in the cassette.

Hence, the Applicant perceived the need to provide a fiber management cassette for storing loops of optical fiber elements that allows reducing tension of the optical fiber elements when the storage cassette is rotated in its storage position after installation of the optical fiber elements therein.

Accordingly, the Applicant has tackled the problem of providing a fiber management cassette for storing loops of optical fiber elements, which allows relieving the tension on the optical fiber elements caused by the rotation of the cassette between a loading position and a storage position.

In one exemplary aspect, the present invention relates to a fiber management cassette for storing loops of one or more optical fiber elements, the cassette comprising: a winding area to accommodate the loops of one or more optical fiber elements; a fiber passageway adjacent to the winding area, the fiber passageway allowing the optical fiber elements to enter and exit the cassette; a pivot element located in the proximity of the fiber passageway, the pivot element being configured to pivot the cassette around a pivot axis perpendicular to a bottom surface of the cassette; and an anti-pull tab comprising a leg extending towards the bottom surface, wherein the anti-pull tab is located in the proximity of the fiber passageway, and wherein the leg is configured to be moved upwards to arrange the optical fiber elements in the fiber passageway underneath the anti-pull tab.

In an exemplary embodiment, the anti-pull tab is flexible.

In an exemplary embodiment, the anti-pull tab projects from a sidewall of the fiber management cassette at an angle between about 30° and about 60° (e.g., between 25° and 65° or so) with respect to the sidewall towards the winding area.

In an exemplary embodiment, an edge of the fiber passageway and a sidewall of the cassette form a further angle greater than 60°.

According to exemplary embodiments of the present invention, the fiber management cassette comprises: a first module comprising a first portion of the winding area and first fixing elements and the fiber passageway; and a second module comprising a second portion of the winding area and second fixing elements; wherein the first fixing elements are configured to engage with the second fixing elements for releasably interconnecting the first module and the second module and to join the first portion and the second portion to form the winding area.

In an exemplary embodiment, the first fixing elements comprise: first clip components arranged at a first end of a free edge of the first module; second clip components arranged at a second end of the free edge; third clip components arranged at the middle of the free edge; and the second fixing elements comprise: first clip components arranged at a first end of a free edge of the second module and configured to engage with the first clip components of the first module to form a first clip when the first module and the second module are releasably interconnected; second clip components arranged at a second end of the free edge of the second module and configured to engage with the second clip components of the first module to form a second clip when the first module and the second module are releasably interconnected; third clip components arranged at the middle of the free edge of the second module and configured to engage with the third clip components of the first module to form a third clip when the first module and the second module are releasably interconnected.

In an exemplary embodiment, the fiber management cassette comprises a mandrel for routing the optical fiber elements in the winding area.

In an exemplary embodiment, the fiber management cassette comprises retaining tabs configured to retain the loops of optical fiber elements in the winding area.

In an exemplary embodiment, the fiber management cassette is made of plastic material.

In a further exemplary aspect, the present invention relates to an optical joint closure comprising a fiber management cassette as set forth above, wherein the fiber management cassette is connected to a frame of the optical joint closure by the pivot element.

In an exemplary embodiment, the pivot element is configured to pivot the cassette between a loading position outside the optical joint closure and a storage position inside the optical joint closure.

In an exemplary embodiment, the fiber management cassette comprises a rotation lock to lock the fiber management cassette in the storage position.

The foregoing illustrative summary, as well as other exemplary objectives, properties, and/or advantages of the invention, and the manner in which the same are accomplished, are further explained within the following detailed description and its accompanying drawings.

BRIEF DESCRIPTION OF THE DRAWINGS

The drawings are provided as examples, may be schematic, and may not be drawn to scale. The present inventive aspects may be embodied in many different forms and should not be construed as limited to the examples depicted in the drawings. The present invention will become fully clear by reading the following detailed description, to be read by referring to the accompanying drawings, wherein:

FIG. 1a is an axonometric view of a first module of the fiber management cassette according to an exemplary embodiment of the present invention;

FIG. 1b is a plan view of the first module of FIG. 1a;

FIG. 2a is an axonometric view of a second module of the fiber management cassette according to an exemplary embodiment of the present invention;

FIG. 2b is a plan view of the second module of FIG. 2a;

FIG. 3 is a plan view of a fiber management cassette according to an exemplary embodiment of the present invention;

FIGS. 5a and 5b schematically show an optical joint closure comprising a fiber management cassette coupled thereto; and FIGS. 6a, 6b, and 6c schematically illustrate the loading position and the storage position of the cassette as coupled to the optical joint closure.

DETAILED DESCRIPTION

Figure 4:
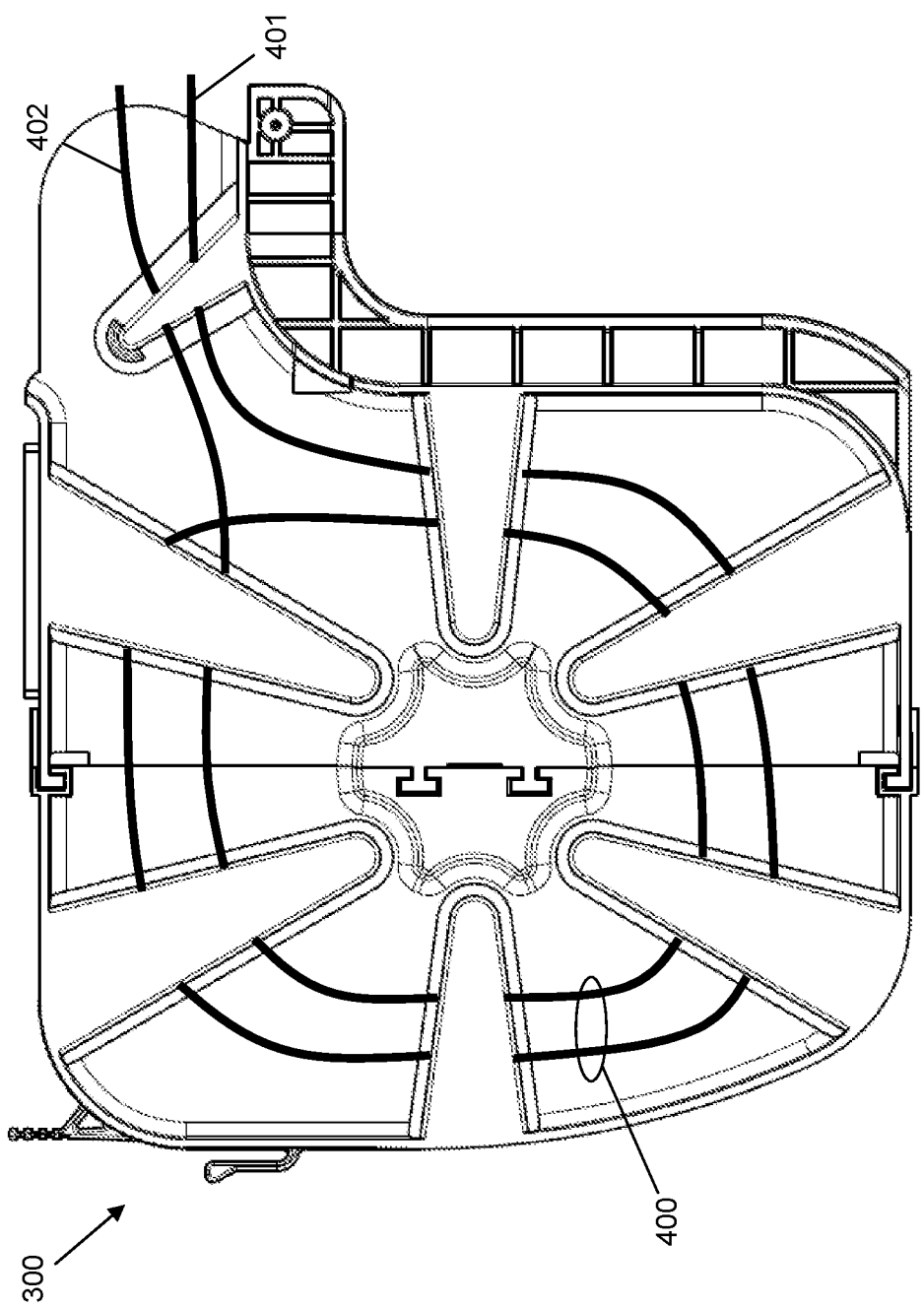
FIG. 4 is a plan view of the fiber management cassette of FIG. 3 illustrating an exemplary arrangement of optical fiber element loops inside the cassette.

In the present description and claims, unless otherwise specified, all the numbers and values should be intended as preceded by the term "about." Also, all ranges include any combination of the maximum and minimum points disclosed and include any intermediate ranges therein, which may or may not be specifically enumerated herein.

The present invention provides a fiber management cassette to be pivotally arranged in an optical fiber installation, such as an optical joint closure or racks housing active equipment that receives or transmits optical signals. The present description will illustrate in detail embodiments of the present invention in which the fiber management cassette is modular (e.g., it comprises at least two modules that are connected together). However, the skilled person will appreciate that this is not limiting, as according to the present invention cassettes having the same technical features may be provided having either a modular structure or a non-modular structure.

As used herein, fiber element means an optical fiber, one or more optical fibers encapsulated in a protective buffer coating, or one or more optical fibers surrounded by a flexible sheath or wrapping.

FIGS. 1a, 1b, and FIGS. 2a, 2b schematically show a first module 1 and a second module 2, respectively, of a fiber management cassette according to an exemplary embodiment of the present invention. Besides, a fiber management cassette comprising the first module 1 and the second module 2 is shown in FIGS. 3 and 4. This cassette may be adapted to be arranged in a pivotable manner inside an optical joint closure (see FIGS. 5a, 5b and 6a, 6b, and 6c), as it will be clearer hereinafter.

FIG. 1b also shows a Cartesian coordinate system with an X-axis and a Y-axis that will be used in the description herein below. Throughout this description, the "width" corresponds to a dimension along a direction substantially parallel to the X-axis, the "length" corresponds to a dimension along a direction substantially parallel to the Y-axis, and the "height" corresponds to a dimension along a direction substantially parallel to the Z-axis, which is perpendicular to the XY-plane.

The first module 1, for example, comprises a substantially flat bottom surface 11, a first sidewall 12, and a second sidewall 13. It further comprises a substantially straight free edge 14 (i.e., an edge that is free from any wall) along which the first module 1 may be connected to the second module, as it will be described hereinafter.

The first sidewall 12 shown in FIGS. 1a and 1b is S-shaped and comprises a first straight lateral portion 121 and second portion 122 in turn comprising a straight part between two curved parts. The curved parts may have a radius greater than a minimum bend radius, which depends on the type of optical fibers to be housed in the cassette. For example, subcategory ITU-T G.657.A1 fibers (see ITU-T G.657 Recommendation, "Characteristics of a bending-loss insensitive single-mode optical fiber and cable" October 2012, page 1) may provide a minimum bend radius equal to about 10 mm, while subcategory ITU-T G.657.A2 fibers may provide a minimum bend radius equal to about 7.5 mm. The radius of the curved parts of the second portion 122, for example, is greater than 15 mm. The second portion 122 of the first sidewall 12, for example, may have a pre-determined thickness, which may vary along the second portion 122.

The second sidewall 13 comprises a straight lateral portion, which is located opposite the first straight lateral portion 121 of the first sidewall 12 as separated by the width of the first module 1.

The first module 1 comprises a first portion 111 of a winding area of the cassette and a fiber passageway 112 adjacent to the first portion 111 of the winding area. The bottom surface of the first portion 111 of the winding area, for example, may have a substantially rectangular shape with a round corner, which corresponds to a curved part of the first sidewall 12. The first portion 111 of the winding area is delimited, along one of its major sides, by the free edge 14. The straight lateral portion 121 of the first sidewall 12 and the straight lateral portion of the second sidewall 13, for example, delimit the first portion 111 of the winding area at its minor sides.

The first portion 111 of the winding area, for example, comprises a portion 15 of a mandrel, which is positioned at the free edge 14 of the first module 1 substantially in the middle thereof. The mandrel is suitable for routing optical fiber elements in said winding area. The portion 15 of the mandrel comprises an upper surface 151, an outer lateral wall 152, and an outer flat surface 153, the latter being located at the free edge 14 of the first module. In the exemplary embodiment shown in FIGS. 1a and 1b, the upper surface 151 of the portion 15 of the mandrel is delimited by an edge 154, which comprises a first portion that is shaped substantially in the form of a number (e.g., three) of arcs of a circle, and a second straight portion at the free edge 14 of the first module. The outer lateral wall 152 of the portion 15 of the mandrel comprises a number (e.g., three) of elongated grooves extending along the height of the first portion of the mandrel and corresponding to the arcs of a circle along the edge 154 of the upper surface of the mandrel.

In an exemplary embodiment, the first module 1 further comprises retaining tabs, such as flexible retaining tabs, configured to retain loops of optical fiber elements. When the loops of optical fiber elements are arranged in the cassette, in particular in the winding area, they are arranged below the retaining tabs, which can be pulled away to let the optical fiber elements pass underneath.

In particular, in the exemplary embodiment shown in FIGS. 1a and 1b, the first module 1 comprises a first retaining tab 16a extending from the first straight lateral portion 121 of the second sidewall 12, a second retaining tab 16b extending from the straight lateral portion of the second sidewall 13, and a third retaining tab 16c extending from the straight part of the second portion 122 of the first sidewall 12. The retaining tabs 16a, 16b, 16c extend, for example, from the sidewalls 12, 13 of the first module 1 towards the portion 15 of the mandrel. Each retaining tab 16a, 16b, 16c extends, for example, from the respective sidewall towards a corresponding groove of the outer lateral wall 152 of the portion 15 of the mandrel so that the free end of each retaining tab 16a, 16b, 16c terminates in the proximity of said groove.

The retaining tabs 16a, 16b, 16c are flat and extend parallel to the bottom surface of the first portion 111 of the winding area. Additionally, the retaining tabs 16a, 16b, 16c are located, for example, at substantially the same height as the upper surface 151 of the portion 15 of the mandrel. In an exemplary embodiment, openings shaped in the same way as the retaining tabs are provided in the bottom surface of the first portion 111 of the winding area of the first module.

The fiber passageway 112 is a portion of the first module 1 extending from the first portion 111 of the winding area at a corner thereof. As shown in FIGS. 1a and 1b, on one side, the fiber passageway 112 is delimited by a portion of the first sidewall 12 of the first module 11, while the other sides of the fiber passageway 112 are free from walls. At the fiber passageway, the first module 1, for example, comprises a fiber tension release tab or "anti-pull" tab 17 projecting from the first sidewall 12 towards the inside of the first module 1, namely towards the first portion 111 of the winding area. In an exemplary embodiment, the anti-pull tab 17 projects from the first sidewall 12 at an angle α comprised between about 30° and about 60° with respect to the first sidewall 12 towards the inside of the first module 1 (in other words, with respect to an axis parallel to the Y-axis of FIG. 1b). The anti-pull tab 17, for example, comprises, at its free end, a leg 171, such as a flexible leg, protruding towards the bottom surface of the fiber passageway 112. The anti-pull tab 17 (in particular, its leg 171) is configured to retain the portions of the optical fiber elements entering and exiting the cassette through the fiber passageway 112. The anti-pull tab 17 (in particular, its leg 171), for example, is flexible in that it can be moved upwardly and then return in its rest position when released. In particular, during operation, the anti-pull tab 17 with its leg 171 is flexed by pulling the tab upwards (i.e., away from the fiber passageway 112) in order to place the optical fiber elements underneath.

In an exemplary embodiment, an opening, shaped in the same way as the anti-pull tab 17, is provided in the bottom surface of the fiber passageway 112.

The first module 1, for example, comprises fixing elements configured to be releasably connected to corresponding fixing elements of the second module, as it will be described hereinafter.

The fixing elements of the first module 1, for example, comprise first clip components 181 arranged in the free end of the first straight lateral portion 121 of the first sidewall 12 at the free edge 14 of the first module 1, second clip components 182 arranged at the free end of the straight lateral portion of the second sidewall 13 at the free edge 14 of the first module 1, and third clip components 183 arranged at substantially the middle of the free edge 14. Each of the first clip components, the second clip components, and the third clip components is configured to engage with corresponding components in the second module to form a first clip, a second clip and a third clip, respectively, to releasably associate the first module with the second module, as it will be described hereinafter.

The first clip components 181 and the second clip components 182 are located, for example, at the opposite ends of the free edge 14 of the first module 1. Each set of clip components 181, 182 comprises a respective hook 181a, 182a, which is formed at the free end of the respective sidewall and projects therefrom, and a respective recess 181b, 182b, which is formed in the free edge 14 of the first module 1 in close proximity to the respective hook 181a,

182a, each pair of hook and recess forming a respective slot configured to engage with a corresponding fastener located in a free edge of the second module to releasably associate the first module 1 with the second module, respectively, as it will be described hereinafter.

Moreover, the first clip components 181, for example, comprise a first hole 181c, such as a rectangular hole, in the first straight lateral portion 121 of the first sidewall 12, in the proximity of its free end; similarly, the second clip components 182 comprises a second hole 182c, such as a rectangular hole, in the straight lateral portion of the second sidewall 13, in the proximity of its free end at the free edge 14. Each hole 181c, 182c, for example, is configured to engage with a corresponding hook projecting from a respective end of a free edge of the second module to releasably associate the first module 1 with the second module, respectively, as it will be described hereinafter.

Furthermore, the third clip components 183, for example, comprises one or more, such as a pair, of parallel elongated fasteners 183a, 183b located on the outer flat surface 153 of the portion 15 of the mandrel and projecting outwards. The fasteners 183a, 183b shown in FIGS. 1a and 1b have a T-shaped cross section. In an exemplary embodiment, the fasteners 183a, 183b are configured to engage with corresponding slots present on an outer flat surface of another portion of the mandrel located in the second module, to releasably associate the first module 1 with the second module, as it will be described hereinafter. Between the fasteners 183a and 183b, the third clip components 183, for example, also comprise a slot 183c formed in the outer flat surface 153 of the portion 15 of the mandrel, which is configured to engage with a corresponding fastener formed in the outer flat surface of another portion of the mandrel comprised in the second module, as it will be described hereinafter.

In the exemplary embodiment shown in FIGS. 1a and 1b, the first sidewall 12 of the first module 1, for example, comprises, in the proximity of the fiber passageway 112, at its free end, a pivot element 19, e.g., a pivot pin, to pivot the cassette around a pivot axis perpendicular the bottom surface of the cassette (or, in other words, parallel to the Z-axis). The pivot element 19 may be in the form of a cylinder having a diameter of a few millimeters, for instance 6.9 mm, and it may be placed within the thickness of the first sidewall 12, at a distance of a few millimeters (e.g., 5.5 mm) from an inner surface of the sidewall 12 (namely a surface that is facing the fiber passageway 112). The pivot element 19 of the first module 1 shown in FIGS. 1a and 1b is configured to engage with a corresponding slot (not shown in the Figures) comprised in the frame of an optical joint closure, to pivotally install the cassette within the optical joint closure, as it will be described in greater detail hereinafter.

The first module 1 is designed in such a way that an angle α' is defined at the free end of the fiber passageway 112 between a direction parallel to the Y-axis and the edge of the fiber passageway 112 as represented in FIG. 1b. In FIG. 1b, angle α' is shown as formed between the inner surface of the sidewall 12 and the edge of the fiber passageway 112. This angle α', for example, is higher than 60°, for instance equal to about 66.7°. Angle α' represents the angle of which the fiber management cassette is positioned, with respect to a substantially vertical direction, when it is brought downwards in its loading position outside the optical joint closure. FIG. 1b also shows three further parameters, indicated with symbols D1, D2, D3, related to the dimensioning of the anti-pull tab 17 and its position relatively to the position of the pivot element 19. According to an exemplary embodiment, D1 may be equal to about 43 mm, D2 to about 23.71 mm, and D3 to about 52 mm. The angle α' and the parameters D1, D2, D3, for example, are dimensioned in order to maximize the capacity of the cassette while guaranteeing the correct amount of strain relief to the optical fiber elements, as the angle α' and the parameters D1, D2, D3 set the amount of slackness for the optical fiber elements before putting them underneath the anti-pull tab 17, as it will be described in greater detail hereinafter with reference to, in particular, FIGS. 6a and 6b.

FIGS. 2a and 2b show the second module 2. The second module 2, for example, comprises a substantially flat bottom surface 21 and a sidewall 22 comprising straight and curved portions. It further comprises a substantially straight free edge 24 along which the second module 2 may be connected to the first module 1, as it will be described hereinafter.

The curved portions of the sidewall 22, for example, have a radius greater than a minimum bend radius of the considered optical fibers, such as greater than about 15 mm, as already discussed above with reference to the first module 1.

The second module 2 comprises a second portion 211 of the winding area of the cassette. The second portion 211 of the winding area, for example, comprises a portion 25 of a mandrel, which is positioned at the free edge 24 of the second module 2 substantially in the middle thereof. The portion 25 of the mandrel comprises an upper surface 251, an outer lateral wall 252, and an outer flat surface 253 at the free edge 24 of the second module 2. In the exemplary embodiment shown in FIGS. 2a and 2b, the upper surface 251 of the portion 25 of the mandrel is delimited by an edge 254 which comprises a first portion that is shaped substantially in the form of a number (e.g., three) of arcs of a circle, and a second straight portion at the free edge 24 of the first module. The outer lateral wall 252 of the portion 25 of the mandrel comprises a number (e.g., three) of elongated grooves extending along the height of the portion 25 of the mandrel and corresponding to the arcs of a circle along the edge 254 of the upper surface 251 of the portion 25 of the mandrel. The outer flat surface 253 of the portion 25 of the mandrel, for example, may be adapted to correspond to the outer flat surface 153 of the portion 15 of the mandrel in the first module 15, so that when the first module 1 and the second module 2 are connected to each other the two portions form a mandrel, around which the optical fiber elements may be wound, as it will be further discussed hereinafter.

In an exemplary embodiment, the second module 2 further comprises retaining tabs, such as flexible retaining tabs, configured to retain the loops of optical fiber elements. In particular, in the exemplary embodiment shown in FIGS. 2a and 2b, the second module 2 comprises a first retaining tab 26a, a second retaining tab 26b, and a third retaining tab 26c extending from the sidewall 22. The retaining tabs 26a, 26b, 26c extend, for example, from the sidewall 22 towards the portion 25 of the mandrel. Each retaining tab 26a, 26b, 26c extends, for example, from the respective sidewall towards a corresponding groove of the outer lateral wall 252 of the portion 25 of the mandrel so that the free end of each retaining tab 26a, 26b, 26c terminates in the proximity of said groove.

The retaining tabs 26a, 26b, 26c are flat and extend parallel to the bottom surface of the second portion 211 of the winding area. Additionally, the retaining tabs 26a, 26b, 26c are located, for example, at substantially the same height as the upper surface 251 of the portion 25 of the mandrel. In an exemplary embodiment, openings shaped in the same way as the retaining tabs are provided in the bottom surface of the second portion 211 of the winding area of the second module 2.

The second module 2, for example, comprises fixing elements configured to be releasably connected to the corresponding fixing elements of the first module, as it will be described hereinafter.

The fixing elements of the second module 2, for example, comprise first clip components 284 arranged in a first free end of the sidewall 22 at the free edge 24 of the second module 2, second clip components 285 arranged at a second free end of the sidewall 22 at the free edge 24 of the second module 2, and third clip components 286 arranged at substantially the middle of the free edge 24. Each of the first clip components, the second clip components, and the third clip components are configured to engage with the corresponding clip components in the first module.

The first clip components 284 and the second clip components 285 are located, for example, at the opposite sides of the free edge 24 of the second module 2. Each set of clip components 284, 285 comprises a respective elongated fastener 284a, 285a, which is formed at the free end of the respective sidewall, and a respective hook 284b, 285b, which projects from the respective free end of the sidewall. Each protuberance 284a, 285a is configured to engage with the corresponding hooks 181a, 182a and recesses 181b, 182b of the first module 1, while each hook 284b, 285b is configured to engage with the corresponding hole 181c, 182c in the sidewalls of the first module 1.

Furthermore, the third clip components 286, for example, comprise one or more, such as a pair, of parallel elongated slots 286a, 286b formed in the outer flat surface 253 of the portion 25 of the mandrel. The slots 286a, 286b shown in FIGS. 2a and 2b have a substantially T-shaped cross-section. In an exemplary embodiment, the slots 286a, 286b are configured to engage with the corresponding fasteners 183a, 183b located on the outer flat surface 153 of the portion 15 of the mandrel of the first module 1. The third clip components 286, for example, also comprise an elongated fastener 286c formed in the outer flat surface 253 of the portion 25 of the mandrel between the slots 286a, 286b, which is configured to slide in the corresponding slot 183c formed in the outer flat surface 153 of the portion 15 of the mandrel comprised in the first module 1.

Furthermore, the second module 2 may optionally comprise a rotation lock 20 to lock the cassette in the storage position into the optical joint closure when rotated upwards after being loaded with the optical fiber elements, as it will be better described hereinafter.

Each of the first module 1 and the second module 2 may be made in one piece by molding from a plastic material. The plastic material used can be, for example, ABS (acrylonitrile-butadiene-styrene).

With reference to the module dimensions indicated in FIG. 1b, the first module 1 has, for instance, a width W of a few hundred millimeters, in particular it may range between 60 mm and 200 mm; an exemplary value may be 176.6 mm. The first module 1 may have a length L of a few hundred millimeters, in particular ranging between 90 mm and 170 mm; an exemplary value may be 143.5 mm. The thickness of the first module 1 (corresponding to the height of the sidewalls) may range between 10 mm and 30 mm. Exemplarily, the first module 1 may have width W equal to about 176.6 mm, length L equal to about 143.5 mm, and thickness equal to about 25 mm.

With reference to the module dimensions indicated in FIG. 2b, the second module has, for instance, a width W of a few hundred millimeters, in particular it may range between 60 mm and 200 mm. The second module 2 may have a length L of a few hundred millimeters, in particular ranging between 75 mm and 150 mm; an exemplary value may be 80 mm. The thickness of the second module 2 (corresponding to the height of the sidewalls) may range between 10 mm and 30 mm. Exemplarily, the second module 2 may have width W equal to about 176.6 mm, length L equal to about 80 mm, and thickness equal to about 25 mm.

FIG. 3 schematically shows an exemplary fiber management cassette 300 according to the present invention. The fiber management cassette 300 comprises the first module 1 and the second module 2. The first module 1 is connected to the second module 2 by juxtaposing the free edge 14 of the first module 1 with the free edge 24 of the second module 2 and engaging the fixing elements of the first module 1 with the fixing elements of the second module 2. In particular, a first clip 301, a second clip 302, and a third clip 303 are formed by sliding the fasteners of the clip components of each of the first module 1 and second module 2 into the corresponding slots of the clip components of the other module (namely, with reference to FIGS. 1a, 1b, 2a, and 2b, the fasteners 284a, 285a into the slots formed by the hook and recess pairs 181a, 181b and 182a, 182b; the fastener 286c into the slot 183c; the fasteners 183a, 183b into the slots 286a, 286b), and fixing the hooks 284b, 285b at the opposite sides of the free edge 24 of the second module 2 into the corresponding holes 181c, 182c present at the opposite sides of the free edge 14 of the first module 1. The clips allow to releasably connect the modules in a very simple manner.

Once the modules are connected, a winding area is formed by the juxtaposition of the first portion 111 and the second portion 211. Moreover, a mandrel 304 is formed by the juxtaposition of the portion 15 of the mandrel of the first module 1 and the portion 25 of the mandrel of the second module 2.

FIG. 4 shows the exemplary fiber management cassette 300 and a possible arrangement of an optical fiber element loop 400. As schematically illustrated in FIG. 4, the optical fiber element loop 400 is arranged in the winding area of the fiber management cassette 300 by routing the optical fiber elements along the boundary of the cassette, for instance in a clockwise direction. The optical fiber elements are retained under the retaining tabs of the modules. The portions of the optical fiber elements entering and exiting the fiber management cassette 300 (these portions are indicated with reference numbers 401 and 402 in FIG. 4) are retained under the anti-pull tab.

FIGS. 5a and 5b schematically show the fiber management cassette 300 as installed in an optical joint closure. The fiber management cassette 300 is pivotally inserted into the optical joint closure by the pivot element 19 of the first module 1 shown in FIGS. 1a and 1b. In particular, after assembling the cassette 300 by connecting together the first module 1 and the second module 2 by their fixing elements, the pivot element is inserted into a slot comprised in the frame of the optical joint closure so that the cassette 300 may be pivoted upwards into the optical joint closure as shown in FIGS. 5a and 5b. The direction of this pivoting operation is indicated with arrow A.

FIGS. 6a-6c schematically illustrate the steps of loading the cassette 300 with the optical fiber element loops and storing the cassette and the optical fiber element loops into the optical joint closure.

In particular, FIG. 6a shows the fiber management cassette in its loading position after it has been rotated downwards outside the optical joint closure. In this loading position, the fiber management cassette, for example, is positioned at the angle α' described above with respect to a substantially vertical direction and hence it is inclined with respect to the horizontal direction as shown in FIG. 6a. In this position, the optical fiber elements 401 entering the fiber management cassette are routed around the free end of the anti-pull tab and then they are routed in the winding area of the cassette around its boundary in the proximity of the cassette sidewalls in a clockwise direction.

FIG. 6b schematically shows the fiber management cassette fully loaded with the optical fiber elements and partially rotated upwards inside the optical joint closure. The anti-pull tab (in particular, its leg) is flexible and it is pulled upwards from the fiber passageway of the cassette, so that the ingoing optical fiber elements 401 are placed underneath. In this situation, the optical fiber elements are loosely held in position by the anti-pull tab.

FIG. 6c schematically shows the fiber management cassette after it has been fully rotated upwards in the substantially vertical storage position inside the optical joint closure. In this position, the rotation lock may be used to firmly lock the fiber management cassette to the frame of the optical joint closure.

The cassette 300 may also be removed from the optical joint closure by disengaging the pivot element from the slot of the closure frame into which it is inserted.

Advantageously, the fiber management cassette of the present invention allows relieving the tension on the optical fiber elements typically caused by the rotation of a cassette between the loading position and the storage position. Indeed, the present invention provides a fiber management cassette comprising a pivot element and an anti-pull tab at a fiber passageway adjacent to the winding area of the cassette. The anti-pull tab at the fiber passageway allows leaving slack when routing the optical fiber elements into the adjacent winding area of the fiber management cassette. In this way, when the fiber management cassette is rotated from the loading position to the storage position, there is no tension on the optical fiber elements. This allows minimizing the attenuation and signal loss associated with the operations of installing the optical fiber elements in the cassette and storing them in the optical joint closure.

To supplement the present disclosure, this application incorporates entirely by reference commonly assigned U.S. patent application Ser. No. 16/676,831 for a Fiber Management Cassette (concurrently filed Nov. 7, 2019), which claims priority to Italian Application No. 102018000010170 (filed Nov. 8, 2018, at the Italian Patent and Trademark Office).

OTHER ASPECTS AND EMBODIMENTS

The foregoing detailed description and accompanying figures set forth typical embodiments of fiber management cassettes. The present disclosure is not limited to such exemplary embodiments. It will be apparent that numerous other embodiments may be provided in accordance with the present disclosure. The present disclosure may utilize any variety of aspects, features, or steps, or combinations thereof. The figures may be schematic representations that are not necessarily drawn to scale.

It is within the scope of this disclosure for one or more of the terms "substantially," "about," "approximately," and/or the like, to qualify each adjective and adverb of the foregoing disclosure, to provide a broad disclosure. As an example, it is believed those of ordinary skill in the art will readily understand that, in different implementations of the features of this disclosure, reasonably different engineering tolerances, precision, and/or accuracy may be applicable and suitable for obtaining the desired result. Accordingly, it is believed those of ordinary skill will readily understand usage herein of the terms such as "substantially," "about," "approximately," and the like.

The figures are schematic representations and so are not necessarily drawn to scale. Unless otherwise noted, specific terms have been used in a generic and descriptive sense and not for purposes of limitation.

While various aspects, features, and embodiments have been disclosed herein, other aspects, features, and embodiments will be apparent to those having ordinary skill in the art. The various disclosed aspects, features, and embodiments are for purposes of illustration and are not intended to be limiting. It is intended that the scope of the present invention includes at least the following claims and their equivalents:

The invention claimed is:

1. A fiber management cassette for storing loops of one or more optical fiber elements, the fiber management cassette comprising:
   a winding area to accommodate said loops of one or more optical fiber elements;
   a fiber passageway adjacent to said winding area, said fiber passageway allowing said optical fiber elements to enter and exit said fiber management cassette;
   a pivot element located in the proximity of the fiber passageway, the pivot element configured to pivot said fiber management cassette around a pivot axis perpendicular to a bottom surface of said fiber management cassette; and
   an anti-pull tab comprising a leg extending towards the bottom surface of said fiber management cassette,
   wherein said anti-pull tab is located in the proximity of said fiber passageway, and
   wherein said leg is configured to be moved upwards relative to said bottom surface to arrange said optical fiber elements in the fiber passageway underneath said anti-pull tab.

2. The fiber management cassette according to claim 1, wherein said anti-pull tab is flexible.

3. The fiber management cassette according to claim 1, wherein the anti-pull tab projects from a sidewall of said fiber management cassette towards said winding area at an angle (α) between 30° and 60° with respect to said sidewall.

4. The fiber management cassette according to claim 3, wherein said sidewall comprises said pivot element.

5. The fiber management cassette according to claim 1, wherein an edge of said fiber passageway and a sidewall of said fiber management cassette form a further angle (α') greater than 60°.

6. The fiber management cassette according to claim 5, wherein said sidewall comprises said pivot element.

7. The fiber management cassette according to claim 1, comprising:
   a first module comprising a first portion of said winding area, first fixing elements, and said fiber passageway; and
   a second module comprising a second portion of said winding area and second fixing elements;
   wherein said first fixing elements are configured to engage with said second fixing elements for releasably interconnecting said first module and said second module and to join said first portion and said second portion to form said winding area.

8. The fiber management cassette according to claim 1, comprising a mandrel for routing said optical fiber elements in said winding area.

9. The fiber management cassette according to claim 1, comprising retaining tabs configured to retain said loops of optical fiber elements in said winding area.

10. An optical joint closure comprising the fiber management cassette according to claim 1, wherein said fiber management cassette is connected to a frame of said optical joint closure by said pivot element.

11. The optical joint closure according to claim 10, wherein said pivot element is configured to pivot said fiber management cassette between a loading position outside said optical joint closure and a storage position inside said optical joint closure.

12. The optical joint closure according to claim 11, wherein said fiber management cassette comprises a rotation lock to lock said fiber management cassette in the storage position.

13. The fiber management cassette according to claim 1, wherein:
said fiber management cassette comprises a wall extending upwardly from said bottom surface of said fiber management cassette;
said anti-pull tab comprises a tab portion that projects inwardly from said wall;
said leg of said anti-pull tab protrudes downwardly from said tab portion;
a gap configured to receive sections of said optical fiber elements is defined between said wall and said leg; and
said gap is positioned underneath said tab portion.

14. The fiber management cassette according to claim 13, wherein said leg of said anti-pull tab protrudes downwardly from a free end of said tab portion of said anti-pull tab.

15. The fiber management cassette according to claim 13, wherein said wall comprises said pivot element.

16. The fiber management cassette according to claim 13, wherein said wall is an outer sidewall of said fiber management cassette.

17. The fiber management cassette according to claim 16, wherein:
said winding area is delimited by said outer sidewall; and
said fiber passageway is delimited by said outer sidewall.

18. The fiber management cassette according to claim 13, wherein:
said pivot element is a cylindrical pivot pin configured to pivotably engage in a hole of a frame of an optical joint closure to pivotally install said fiber management cassette within said optical joint closure; and
said wall comprises said pivot pin.

19. The fiber management cassette according to claim 18, wherein:
said wall is an outer sidewall of said fiber management cassette;
said winding area is delimited by said outer sidewall; and
said fiber passageway is delimited by said outer sidewall.

20. The fiber management cassette according to claim 1, wherein at least a portion of said anti-pull tab is flexible so that:
said leg is configured to be moved upwardly relative to said bottom surface from a rest position to a flexed position to arrange said optical fiber elements in said fiber passageway underneath said anti-pull tab; and
said leg returns toward said rest position in response to release from said flexed position.

* * * * *